UNITED STATES PATENT OFFICE.

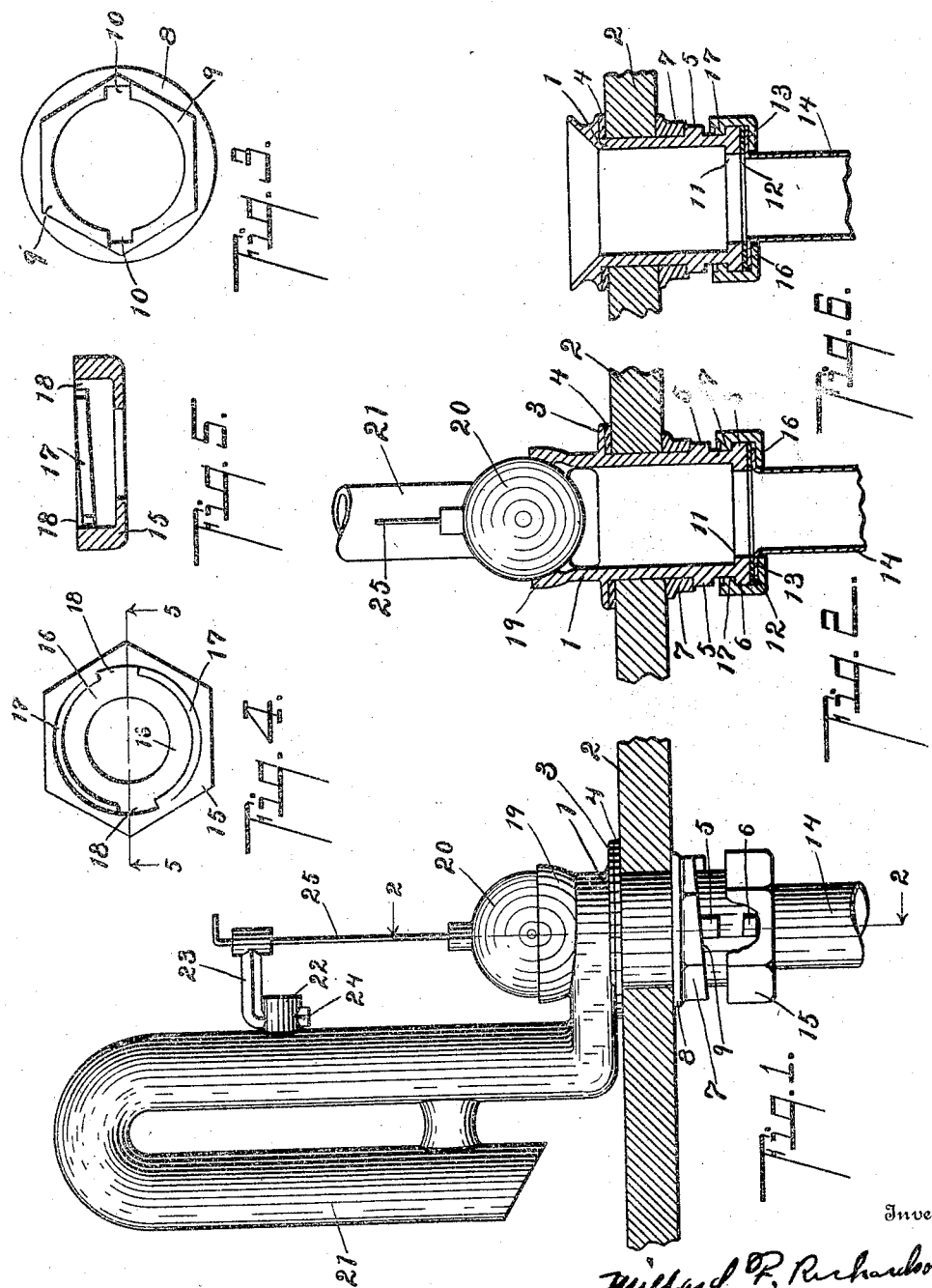

MILLARD F. RICHARDSON, OF KALAMAZOO, MICHIGAN.

COUPLING.

No. 887,270.  Specification of Letters Patent.  Patented May 12, 1908.

Application filed December 16, 1907. Serial No. 406,721.

*To all whom it may concern:*

Be it known that I, MILLARD F. RICHARDSON, a citizen of the United States, residing in the city and county of Kalamazoo, State of Michigan, have invented certain new and useful Improvements in Couplings, of which the following is a specification.

This invention relates to improvements in couplings.

My improved coupling is particularly designed and adapted by me as a coupling for pipes to tanks, such as the siphon or ball cock pipes for flushing tanks, and the supply pipes for such tanks, although it is adapted for use in various other relations.

The main objects of this invention are: first, to provide an improved coupling which may be satisfactorily produced without the necessity of threading machine work in the production or finishing thereof and of such strength as to effectively support the gooseneck when made integral therewith; second, to provide an improved coupling which is very strong and durable, although the same may be made of such material as castiron and be made comparatively light; third, to provide an improved coupling, the parts of which may be quickly assembled or disassembled, and also one which may be quickly attached or detached from a tank and which permits ready inspection of the joint.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which, Figure 1 is a side elevation of a structure embodying the features of my invention; Fig. 2 is a detail vertical section, taken on a line corresponding to line 2—2 of Fig. 1; Fig. 3 is an inverted view of the clamping member or nut 7; Fig. 4 is a plan view of the pipe coupling member 15; Fig. 5 is a vertical section of the pipe coupling member, taken on a line corresponding to line 5—5 of Fig. 4; Fig. 6 is a detail vertical section, corresponding to the view in Fig. 2, of a modified construction, the goose-neck being omitted.

In the drawing, the sectional views are taken looking in the direction of the little arrows at the ends of the section lines, and similar numerals of reference refer to similar parts throughout the several views.

Referring to the drawing, the main coupling member 1 is adapted to be arranged through the bottom of a tank, as 2. The coupling member 1 is provided with a flange 3 adapted to engage the inside of the bottom of the tank, a gasket, as 4, being preferably arranged under the flange. At its lower end, the coupling member 1 is provided with pairs of oppositely-disposed lugs, as 5—5, and 6—6. These lugs are arranged in a spaced relation and preferably in alinement. The clamping ring, or nut 7, is adapted to be sleeved upon the coupling member 1, and is provided with a flange 8 at its upper edge, adapted to engage the under side of the tank bottom, as clearly illustrated in the drawing. This nut is provided with a pair of spiral surfaces 9, on its lower edge, adapted to engage the upper pair of lugs 5, so that, by turning the clamping member, the coupling member is clamped to the tank bottom.

To permit the placing of the clamping member upon or its removal from the coupling member 1, I provide the same with a pair of oppositely-arranged notches 10, adapted to receive the lugs 5 and 6, when brought into register therewith. This leaves also an open space for the passage of moisture down onto the coupling so that an incomplete joint can be readily detected. If a screw is used at this place the space is so completely closed by the threads that a leak will not be detected until it has soaked the wood, warping the same, and ruining its appearance, besides subjecting the parts to rot; also soaking the wood with water, causing the same to crack and in that way destroy the bottom.

The coupling member 1 is preferably provided with an inwardly-projecting annular flange 11 at its lower end for the purpose of strengthening the same, and, further, for the purpose of forming a wide bearing for the gasket 12, arranged between it and the flange 13 of the pipe 14; see Figs. 2 and 6. The pipe 14 is detachably secured to the coupling member 1 by means of the pipe coupling member 15, which is provided with an inwardly-projecting flange 16 adapted to receive the flange 13 of the pipe 14. The pipe coupling member 15 is adapted to be slipped on the lower end of the corresponding coupling member 1, and is provided with a pair of spirals 17 adapted to engage the lower pair of lugs 6, so that, by turning the coupling member, the flange 13 is clamped against the lower end of the coupling member 1. The coupling member 15 is notched at 18 to permit its being placed upon the main coupling member when the notches are brought into register with the lugs.

I preferably form a valve seat 19 on the upper end of the coupling member 1 for the valve, as 20. I also preferably form the siphon or goose-neck 21 integrally with the coupling member 1. On one arm of the siphon or goose-neck I form a lug 22 having a vertical hole therethrough adapted to receive the downturned end 24 of the guide arm 23 for the valve stem 25.

By thus forming the parts, I am able to produce the structure very economically, and without the necessity of machine work or die work in finishing. It is found, in practice, where it is attempted to thread castiron attachments of this class that great care must be taken in properly centering the work and in securing the proper thickness of the walls, as, if there is any imperfection in this respect, the coupling is likely to be broken in applying the nuts thereto. By my present invention, I overcome the necessity for threading and for the expensive machine work, thereby greatly reducing the cost of production. This is further reduced in that the parts may be assembled much more quickly than it is possible where they are threaded together. This is also of advantage in applying the attachment to the tanks, and the attachment may also be quickly removed should occasion require, it being practically impossible for it to become so rusted or so corroded that it cannot be readily detached; whereas, when the coupling members are threaded together, they frequently become so set and corroded,—unless formed of non-corrodible material—as to render it quite impossible to disconnect the same without destroying or seriously injuring the coupling.

The coupling member is preferably arranged to turn in a direction opposite to that of the clamping member 7 in tightening so that there is no danger of the member 7 being accidentally loosened in adjusting the member 15.

While I preferably form the goose-neck and valve seat integrally with the main coupling member, as I have illustrated and described,—as I am enabled by forming the parts as I have illustrated to successfully accomplish this,—the goose-neck may be formed separately, as is illustrated in Fig. 6, or the device may be adapted by suitable modification for use in other relations than that of flushing tanks.

Having thus described my invention, what I claim as new and desire to secure by Letters Patent is:

1. In a structure of the class described, the combination of a main coupling member adapted to be arranged through the bottom of a tank, said coupling member being provided with an annular flange adapted to engage the inside of the tank bottom and with pairs of oppositely-disposed lugs arranged in a spaced relation, said coupling member having a goose-neck or siphon and a valve seat formed integrally therewith; a clamping member adapted to be sleeved upon said main coupling member to engage the under side of the tank bottom having a pair of spiral surfaces on its lower edge adapted to engage the upper pair of said lugs, said clamping member having oppositely-arranged internal notches adapted to receive said lugs to permit its being placed upon or removed from said coupling member; a pipe having an outwardly-projecting flange at its upper end; and a pipe coupling member adapted to embrace the lower end of said main coupling member having an inwardly-projecting flange at its lower end adapted to engage the said flange of said pipe and a pair of oppositely-arranged internal lug-engaging spirals, of opposite pitch to the spirals of the coupling, adapted to engage the lower pair of said lugs, said pipe coupling member having oppositely-arranged internal notches adapted to receive the lower pair of lugs to permit its being placed upon or removed from said coupling member.

2. In a structure of the class described, the combination of a main coupling member adapted to be arranged through the bottom of a tank, said coupling member being provided with an annular flange adapted to engage the inside of the tank bottom and with pairs of oppositely-disposed lugs arranged in a spaced relation; a clamping member adapted to be sleeved upon said main coupling member to engage the under side of the tank bottom having a pair of spiral surfaces on its lower edge adapted to engage the upper pair of said lugs, said clamping member having oppositely-arranged internal notches adapted to receive said lugs to permit its being placed upon or removed from said coupling member; a pipe having an outwardly-projecting flange at its upper end; and a pipe coupling member adapted to embrace the lower end of said main coupling member having an inwardly-projecting flange at its lower end adapted to engage the said flange of said pipe and a pair of oppositely-arranged internal lug-engaging spirals, of opposite pitch to the spirals of the coupling, adapted to engage the lower pair of said lugs, said pipe coupling member having oppositely-arranged internal notches adapted to receive the lower pair of lugs to permit its being placed upon or removed from said coupling member.

3. In a structure of the class described, the combination of a main coupling member adapted to be arranged through the bottom of a tank, said coupling member being provided with an annular flange adapted to engage the inside of the tank bottom and with pairs of oppositely-disposed lugs arranged in a spaced relation, said coupling member having a valve seat formed integrally therewith; a clamping member adapted to be sleeved upon said main coupling member to engage the under side of the tank bottom having a pair of spirals adapted to engage the upper pair of said lugs, said clamping member having oppositely-arranged internal notches adapted to receive said lugs to permit its being placed upon or removed from said coupling member; and a pipe coupling adapted to embrace the lower end of said main coupling member having a pair of oppositely-arranged internal lug-engaging spirals, of opposite pitch to the spirals of the coupling, adapted to engage the lower pair of said lugs, said pipe coupling member having oppositely-arranged internal notches to receive the lower pairs of lugs to permit its being placed upon or removed from said coupling member.

4. In a structure of the class described, the combination of a main coupling member adapted to be arranged through the bottom of a tank, said coupling member being provided with an annular flange adapted to engage the inside of the tank bottom and with pairs of oppositely-disposed lugs arranged in a spaced relation; a clamping member adapted to be sleeved upon said main coupling member to engage the under side of the tank bottom having a pair of spirals adapted to engage the upper pair of said lugs, said clamping member having oppositely-arranged internal notches adapted to receive said lugs to permit its being placed upon or removed from said coupling member said notches forming a space between said coupling and clamping member for the passage of moisture if the joint is defective; and a pipe coupling member adapted to embrace the lower end of said main coupling member having a pair of oppositely-arranged internal lug-engaging spirals adapted to engage the lower pair of said lugs, said pipe coupling member having oppositely-arranged internal notches adapted to receive the lower pair of lugs to permit its being placed upon or removed from said coupling member.

5. In a structure of the class described, the combination of a main coupling member adapted to be arranged through the bottom of a tank, said coupling member being provided with an annular flange adapted to engage the inside of the tank bottom; pairs of oppositely-disposed lugs arranged in a spaced relation; a clamping member adapted to be sleeved upon said main coupling member to engage the under side of the tank bottom, having a pair of spirals adapted to engage the upper pair of lugs, said clamping member having oppositely-arranged internal notches adapted to receive the lugs to permit its being placed upon or removed from said coupling member; and a pipe coupling member adapted to embrace the lower end of said main coupling member having a pair of oppositely-arranged internal lug-engaging spirals adapted to engage the lower pair of said lugs, said spirals being oppositely pitched to the spirals of said clamping member, whereby they are turned in opposite directions in tightening.

6. In a structure of the class described, the combination of a coupling member adapted to be arranged through the bottom of a tank, said coupling member being provided with an annular flange adapted to engage the inside of the tank bottom, and with a pair of oppositely disposed lugs thereon; a clamping member adapted to be sleeved upon said coupling member to engage the underside of the tank bottom, having a pair of inwardly projecting spirals adapted to engage the said lugs, said clamping member having oppositely arranged internal notches adapted to receive said lugs to permit its being placed upon or removed from said coupling member, said notches forming a space between the said coupling and clamping member for the passage of moisture if the joint is defective, for the purpose specified.

In witness whereof, I have hereunto set my hand and seal in the presence of two witnesses.

MILLARD F. RICHARDSON. [L. S.]

Witnesses:
HOMER MANVAL,
JNO. S. ROCKWELL.